United States Patent
Mrani et al.

(10) Patent No.: US 11,756,541 B1
(45) Date of Patent: Sep. 12, 2023

(54) CONTEXTUAL RESOLVER FOR VOICE REQUESTS

(71) Applicant: Amazon Technologies, Inc., Seattle, WA (US)

(72) Inventors: Driss Alaoui Mrani, Levallois-Perrret (FR); Ashlesha Vishnu Kadam, Seattle, WA (US); Manigantan Sethuraman, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 17/000,777

(22) Filed: Aug. 24, 2020

(51) Int. Cl.
| | |
|---|---|
| *G10L 15/22* | (2006.01) |
| *G06F 16/48* | (2019.01) |
| *G06F 16/2457* | (2019.01) |
| *G06F 16/438* | (2019.01) |
| *G06N 5/04* | (2023.01) |
| *G06F 3/16* | (2006.01) |
| *G10L 15/18* | (2013.01) |
| *G06N 20/00* | (2019.01) |

(52) U.S. Cl.
CPC ........... *G10L 15/22* (2013.01); *G06F 3/165* (2013.01); *G06F 16/24578* (2019.01); *G06F 16/438* (2019.01); *G06F 16/48* (2019.01); *G06N 5/04* (2013.01); *G06N 20/00* (2019.01); *G10L 15/1815* (2013.01); *G10L 2015/223* (2013.01); *G10L 2015/228* (2013.01)

(58) Field of Classification Search
CPC ............... G10L 15/22; G10L 15/1815; G10L 2015/223; G10L 2015/228; G06F 16/438; G06F 16/24578; G06F 16/48; G06F 3/165; G06F 16/685; G06N 20/00
See application file for complete search history.

(56) References Cited

U.S. PATENT DOCUMENTS

| | | | | |
|---|---|---|---|---|
| 9,454,957 | B1* | 9/2016 | Mathias | G06F 40/295 |
| 10,068,573 | B1* | 9/2018 | Aykac | G06F 3/165 |
| 10,789,948 | B1* | 9/2020 | Klein | G06F 16/3329 |
| 11,133,004 | B1* | 9/2021 | Naik | G10L 15/22 |
| 2011/0060587 | A1* | 3/2011 | Phillips | G10L 15/30 |
| | | | | 704/235 |
| 2018/0336894 | A1* | 11/2018 | Graham | G06F 16/685 |

* cited by examiner

*Primary Examiner* — Michael Colucci
(74) *Attorney, Agent, or Firm* — Kilpatrick Townsend & Stockton LLP

(57) ABSTRACT

Contextual data associated with an ambiguous voice command to a voice-controlled device can be used to provide information to complete the voice request without requiring additional input or an explicit statement of information from the user. Contextual data and voice request data are inputs to a machine learning ranker that produces a confidence score useful for selecting a data object and providing implicit information to fulfill the voice request. Once the data object is selected, the voice request is performed by the voice-controlled device.

20 Claims, 7 Drawing Sheets

CONTEXTUAL RESOLVER FOR VOICE REQUESTS

BACKGROUND

Voice interfaces of electronic devices, such as voice-controlled devices, can be used to receive and process instructions from users. For example, a user can instruct a voice-controlled device including a speaker to play a particular song by a particular artist. So long as the user correctly and clearly identifies the song by the correct title and the artist by the correct name, a backend server associated with the voice-controlled device will likely be able to look up the song in a storage location and, assuming it is found, provide it to the voice-controlled device for playback.

When the user's instructions with respect to a user goal (e.g., to play a song) are vague or otherwise less definite, correctly identifying the user goal may prove challenging.

BRIEF DESCRIPTION OF THE DRAWINGS

Various embodiments in accordance with the present disclosure will be described with reference to the drawings, in which.

DETAILED DESCRIPTION

Figure 1:
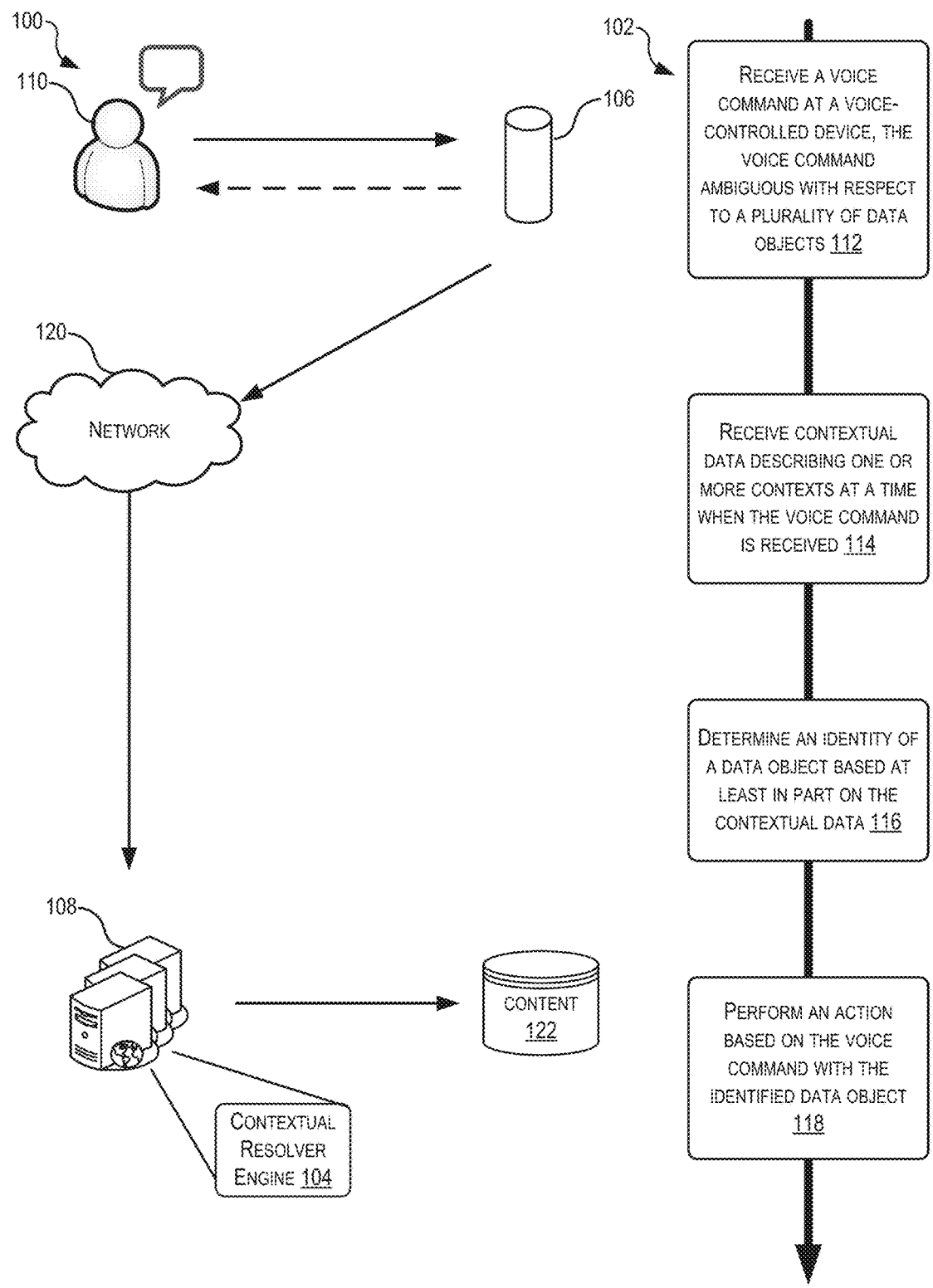
FIG. 1 is an example block diagram and associated flowchart showing a process for implementing techniques relating to contextual resolving of ambiguous voice commands to voice-controlled devices, according to at least one example.

Examples described herein are directed to, among other things, techniques for processing voice requests based on contextual information, in particular when the voice request is ambiguous in at least one sense. Conventional approaches for processing voice requests typically include determining the data object or identity of an item to be returned (e.g., music files, collections of music files, image files, video files, text files, and other such files as well as smart devices such as connected appliances, light bulbs, sound producing devices, and the like) using solely explicit information provided in the voice command, such as an exact song or artist name. In some cases, these approaches may fail at returning the right content since the voice request may lack the implicit context of the user's intent or may be ambiguous with respect to one or more data objects without reference to the implicit context. This implicit context can take various forms such as a music object already playing at the time the request is made, the location of the request or a relationship between media entities. Failing to take into account this context can be frustrating to some users as it forces them to perform additional steps to look for the context and explicitly include it in the voice request. This makes some voice requests unnatural and in some instances affects the overall user experience with using voice assistants.

Techniques described herein for processing voice requests based on contextual information may overcome some of the issues faced in the aforementioned conventional approaches. The contextual resolver takes into account different types of contexts, such as relational, location, and time based contexts. The contextual resolver identifies contextual information and provides the contextual information as well as a user-input request identified from the voice request of the user to a machine learning algorithm. In some examples, the contextual data and the user-input request may be inputs into a machine learning algorithm that outputs a result or ranked list of results for the user-input request based on all of the contextual data inputs. The machine learning algorithm may be trained using voice command data including both implicit and explicit commands to a voice-controlled device. The user-input request is identified from the voice request using a natural language processing algorithm. The user-input request and the contextual information are used in conjunction to fulfill requests or commands to the voice-controlled device that rely on implicit information or are ambiguous with respect to one or more possible outcomes. The contextual data may provide information implied by the user in the voice request to accomplish the voice command. The missing contextual information may be explicitly identified and searched for within the contextual data, for example, by searching for a particular artist identity following a request from a user to "play more music from this artist." In this example, the contextual information may be queried from the contextual data and used to fulfill the request.

Turning now to a particular example, a user may initially perform a voice command to a voice-controlled device to request a particular song be played. The initial request may explicitly identify the song to be played and not require any implicit information to process the request. Subsequently, the user may decide they wish to listen to the entire album the song is included on, or to listen to more music from that artist. The user may simply voice that they would like to "listen to more music from this artist" or "listen to this album." In these example voice commands, the explicit information included in the voice request is insufficient for the voice-controlled device to complete a request as the artist or album are not specified and are therefore ambiguous. In conventional methods, the user would then have to follow up with additional information, for example by specifying the identity of the artist or the name of the album. In the examples described herein, the voice-controlled device may identify from the existing context that "this artist" or "the album" relates to the music currently playing and identify the relevant contextual information to carry out the voice request to play more music by the artist or to queue the album for playing without additional user input.

In some examples, other contextual data can be used to identify and clarify ambiguous voice requests to a voice-controlled device. For example, the context may include relational information, time-based information, user preference information, location information, and other suitable context-based information. The relational information may relate to relationships between music or data currently in use by the voice-controlled device as described above. The time-based information may provide contextual clues with respect to a season, time of day, month, day of the week, or other such granular time information. With such information, a request to "play music" may be ambiguous to conventional systems, while the contextual resolver may identify that the request has fallen during a particular holiday season and begin playing music associated with the holiday. In some other examples, a user may have particular music preferences such as playing a genre of music during the day while working versus during an evening or weekend when louder or more energetic music may be selected to be played. The user preference information can include previous user selections and may also include previous ambiguous user requests and outcomes from those interactions. For instance, a user may have previously requested to play music at a certain time of day and after an initial music selection was played by the voice-controlled device, the user may not have changed the genre or type of music playing, perhaps indicating that the request was met with satisfaction. Additional user preferences may be explicitly set by the user in some examples. The location information may be especially useful in instances where a user has more than one voice-controlled device within their home. A voice request to play music at a first voice-controlled device may begin playing a particular song, subsequently, the user may move to another location in the home and wish to continue listening to the music by simply stating "play the music in here." With the additional contextual information of the music already playing at another voice-controlled device as well as the information of what music is playing, the voice-controlled device may begin playing the same music in the new location.

In another example, a user may perform a voice command to a voice-controlled device to request an action with respect to a connected device. The request may not explicitly identify the connected device, for example, the user may request to "turn of this light." In this example voice command, the explicit information included in the voice request is insufficient for the voice-controlled device to complete a request as the identity of the light is not specified explicitly and the request is therefore ambiguous. In conventional methods, the user would then have to follow up with additional information, for example by specifying the identity or location of the light. In the examples described herein, the voice-controlled device may identify from the existing context, such as the location of the user or the voice-controlled device that "this light" relates to a light in proximity to the location of the user or the voice-controlled device to carry out the voice request to turn off the light without additional user input.

The techniques and methods described herein provide several advantages over conventional voice-control systems and methods. For example, the techniques described herein provide simpler and faster use of voice-controlled devices by users by reducing the number of steps to accomplish a particular command. The techniques described herein also enable processing of voice commands that would otherwise not be possible for a voice-controlled device to process. The techniques described herein provide a voice-controlled device with the ability to process voice commands with implicit information rather than solely on explicit information provided in a voice request.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Turning now to the figures, FIG. 1 is an example block diagram 100 and associated flowchart showing a process 102 for implementing techniques relating to contextual resolving of ambiguous voice commands to voice-controlled devices, according to at least one example. The diagram 100 depicts devices, objects, and the like that correspond to the process 102. The process 102 can be performed by a contextual resolver engine 104, which may be implemented in a server computer (e.g., service provider 108) to resolve ambiguous voice requests received from a voice-controlled device based on contextual data. In some examples, at least a portion of the contextual resolver engine 104 is implemented by a user device (e.g., a voice-controlled device 106).

The process 102 may begin at 112 by receiving a voice command at a voice-controlled device 106. The voice command may be ambiguous with respect to a plurality of data objects. The voice command may be ambiguous by not uniquely identifying or explicitly identifying a single data object. Ambiguity may be present with respect to identifying or differentiating between different data objects based solely on the information explicitly provided in the voice command. The voice command is issue by user 110. The voice command may come from the user 110 speaking at the voice-controlled device 106 via a voice interface of the voice-controlled device 106. The voice-controlled device 106 processes the voice command and identifies ambiguous voice commands, such as voice commands that must rely on implicit information rather than solely on explicit information included in the voice command. The voice interface may be embodied in a variety of user devices, including computing devices, smartphones, standalone digital assistant devices, and other such user devices.

At 114, the process 102 may include receiving contextual data describing one or more contexts at a particular time when the voice command is received. The contextual data may include data relating to data objects previously and/or currently in use by the voice-controlled device 106, such as music files. The contextual data may also include location information, such as a location of the voice-controlled device 106 in addition to a location of a second voice-controlled device (not shown). The contextual data may also include data relating to the time of the voice command. For instance, the time data may include a time of day, a day of the week, a month, a holiday, a particular season, or other such temporal information that may provide context clues for the environment the user 110 is situated in. The contextual data may include one or all of a number of contextual parameters describing an environment, condition, status, or location of the user 110 and the voice-controlled device 106.

At 116, the process 102 may determining an identity of a data object based at least in part on the contextual data. The identity of the data object may be identified through the use of a machine learning algorithm, for example a machine learning algorithm of the contextual resolver engine 104. The identity of the data object may also be directly identified by identifying missing parameters in the voice command, for example, a subset of data that would render the voice command unambiguous.

In some examples, the identity of the data object may be identified by providing the 15 voice command and contextual data to the machine learning algorithm. The machine learning algorithm may then output a ranked list of data objects, higher ranking corresponding to a higher confidence that a particular data object is the data object referred to by the user in the voice command. In some examples, the machine learning algorithm may output a single result, such as a single data object according to the voice command. In some examples, the machine learning algorithm may output multiple results, such as a list of possible data objects and confidence scores corresponding to each of the possible data objects. The identity of the data object may be identified from a content item database 122. The data object may be stored in the content item database 122 and accessible via a network 120 connecting the service provider 108 to the voice-controlled device 106. In some examples, the voice-controlled device 106 may include a database having the data object therein.

At 118, the process 102 may include performing an action based on the voice command with the identified data object from 116. This may include, for example, playing a music file identified at 116. The action may include performing, with the voice-controlled device 106, an action using the data object. In some examples, the voice-controlled device 106 may cause one or more other systems, such as external speakers or other voice-controlled devices (not shown) to perform operations with the data object as instructed by the user 110.

Figure 2:
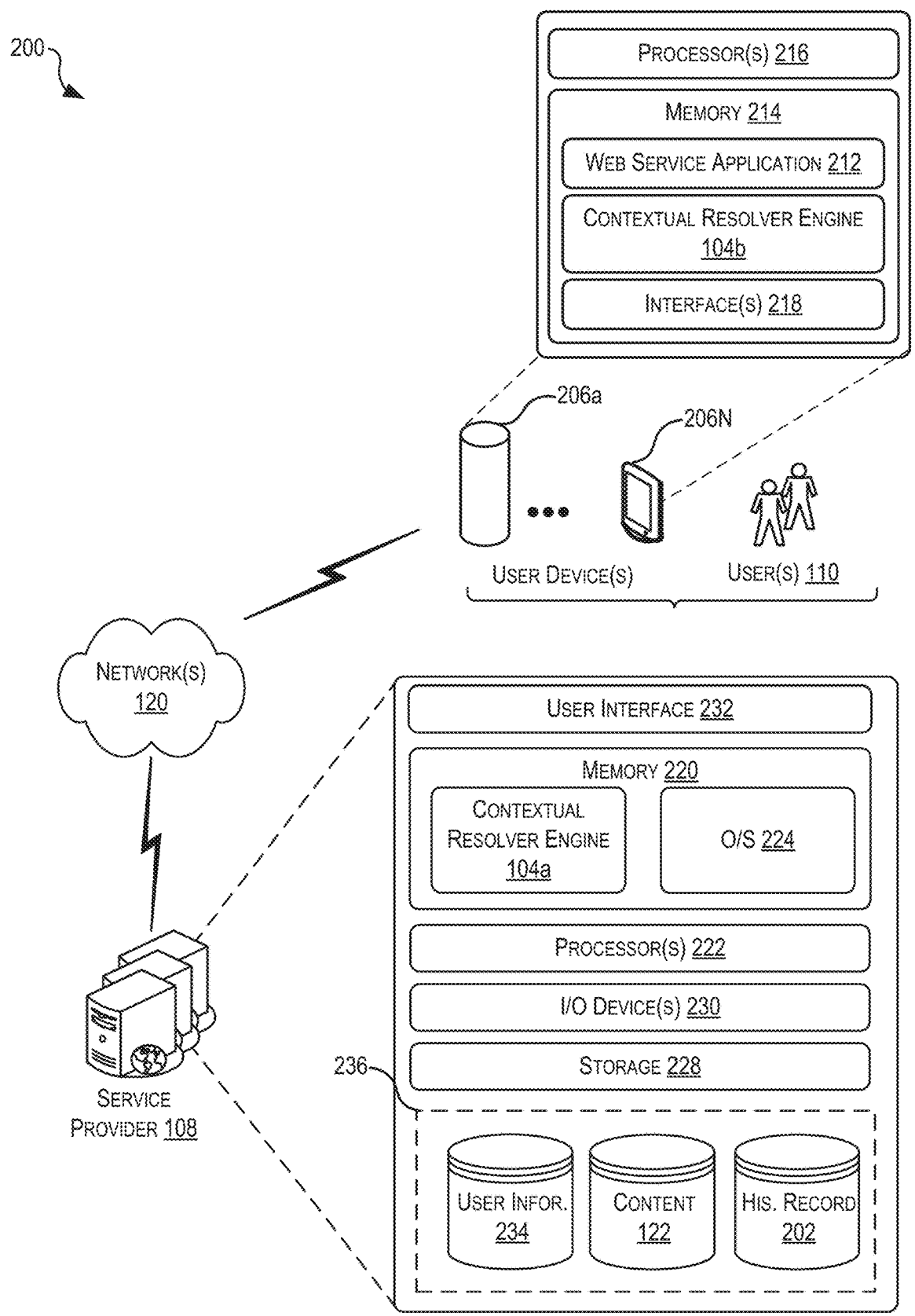
FIG. 2 is an example schematic architecture for implementing techniques relating to contextual resolving of voice commands, according to at least one example.

FIG. 2 is an example schematic architecture 200 for implementing techniques relating to contextual resolving of voice commands, according to at least one example. The architecture 200 may include the service provider 108 in communication with one or more user devices 206a-206N via one or more networks 120 (hereinafter, "the network 120").

The user device 206, which is an example of the voice-controlled device 106, may be operable by one or more users 110 to interact with the service provider 108. The user device 206 may be any suitable type of computing device such as, but not limited to, a wearable device, voice-controlled device (e.g., a smart speaker), a tablet, a mobile phone, a smart phone, a network-enabled streaming device (a high-definition multimedia interface ("HDMI") microconsole pluggable device), a personal digital assistant ("PDA"), a laptop computer, a desktop computer, a thin-client device, a tablet computer, a high-definition television, a web-enabled high-definition television, a set-top box, etc. For example, the user device 206a is illustrated as an example of voice-controlled user device, while the user device 206N is illustrated as an example of a handheld mobile device. In some example, the user device 206a may be connected to a voice-controlled intelligent personal assistant services. The user device 206a may respond to some predefined "wake word" such as "computer." In some examples, the user device 206a is capable of voice interaction, music playback, making to-do lists, setting alarms, streaming podcasts, playing audiobooks, and providing weather, traffic and other real-time information. In some examples, the user device 206a can also control several smart devices acting as a home automation hub. In some examples, electronic content items are streamed from the service provider 108 via the network 120 to the user device 206.

The user device 206 may include a memory 214 and processor(s) 216. In the memory 214 may be stored program instructions that are loadable and executable on the processor(s) 216, as well as data generated during the execution of these programs. Depending on the configuration and type of user device 206, the memory 214 may be volatile (such as random access memory ("RAM")) and/or non-volatile (such as read-only memory (ROM), flash memory, etc.).

In some examples, the memory 214 may include a web service application 212 and a contextual resolver engine 104b. The web service application 212 and/or the contextual resolver engine 104b may allow the user 110 to interact with the service provider 108 via the network 120. Such interactions may include, for example, creating, updating, and managing user preferences associated with the user 110, any one of the user devices 206, and/or streaming content. For example, the user 110 may identify what types of content she finds interesting. The memory 214 also includes one or more user interfaces 218. The interfaces 218 may enable user interaction with the user device 206. For example, the interfaces 218 can include a voice interface to receive voice instructions and output verbal information (e.g., play streaming or stored content items), prompts for information, and other requested information.

Turning now to the details of the service provider 108, the service provider 108 may include one or more service provider computers, perhaps arranged in a cluster of servers or as a server farm, and may host web service applications. The function of the service provider 108 may be implemented a cloud-based environment such that individual components of the service provider 108 are virtual resources in a distributed environment. The service provider 108 also may be implemented as part of an electronic marketplace (not shown). In some examples, the service provider 108 may be configured to provide digital content streams to the user devices 206.

The service provider 108 may include at least one memory 220 and one or more processing units (or processor(s)) 222. The processor 222 may be implemented as appropriate in hardware, computer-executable instructions, software, firmware, or combinations thereof. Computer-executable instruction, software, or firmware implementations of the processor 222 may include computer-executable or machine-executable instructions written in any suitable programming language to perform the various functions described. The memory 220 may include more than one memory and may be distributed throughout the service provider 108. The memory 220 may store program instructions that are loadable and executable on the processor(s) 222, as well as data generated during the execution of these programs. Depending on the configuration and type of memory including the service provider 108, the memory 220 may be volatile (such as RAM and/or non-volatile (such as read-only memory ("ROM"), flash memory, or other memory). The memory 220 may include an operating system 224 and one or more application programs, modules, or services for implementing the features disclosed herein including at least the contextual resolver engine 104a.

The service provider 108 may also include additional storage 228, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 228, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the service provider 108 and/or part of the user device 206.

The service provider 108 may also include input/output (I/O) device(s) and/or ports 230, such as for enabling connection with a keyboard, a mouse, a pen, a voice input device, a touch input device, a display, speakers, a printer, or other I/O device.

In some examples, the service provider 108 may also include one or more user interface(s) 232. The user interface 232 may be utilized by an operator, curator, or other authorized user to access portions of the service provider 108. In some examples, the user interface 232 may include a graphical user interface, voice interfaces, web-based applications, programmatic interfaces such as APIs, or other user interface configurations. The service provider 108 may also include the datastore 236. In some examples, the datastore 236 may include one or more databases, data structures, or the like for storing and/or retaining information associated with the service provider 108. Thus, the datastore 236 may include data structures, such as a user information database 234, the content item database 122, and a historical record database 202.

The user information database 234 may be used to retain information pertaining to users of the service provider 108 such as the user 110. Such information may include, for example, user preferences, user account information (e.g., electronic profiles for individual users), demographic information for users, payment instrument information for users (e.g., credit card, debit cards, bank account information, and other similar payment processing instruments), account preferences for users, purchase history of users, wish-lists of users, search histories for users, and other similar information pertaining to a particular user, and sets of users, of the service provider 108.

In some examples, the user preferences stored in the user information database 234 may be specific to particular user devices, to particular users, or to any combination of the foregoing. For example, the user 110 may be associated with a plurality of user devices of the user devices 206a-206N. In this example, the user 110 may be a primary user and may create specific user preferences for each of the plurality of user devices 206 such that each of the plurality of user devices 206 are operable in accordance with its respective user preferences, which may be identified based at least in part on a user profile of the user 110. In this manner, the user preference may be fixed to the user device 206, irrespective of which user is accessing the user device 206. In some examples, the user 110 may set up primary user preferences, which may be the default user preference when a new user device is associated with the user. This configuration for managing user preferences may be desirable when the primary user is a parent and at least some of the user devices 206 that are associated with the primary user are used by children of the primary user.

In some examples, each of the users 110 may have their own user preferences (e.g., as part of a user profile) that may be portable between any of the user devices 206. Such user preferences may be associated with a particular user device 206 after the user 110 logs in to the user device 206 (e.g., logs into the contextual resolver engine 104) using user credentials. This configuration for managing user preferences may be desirable when each of the users 110 is capable of managing its own user preferences.

The content item database 122 may include an expansive collection of digital content (e.g., music, videos, etc.) that is available for streaming and/or for downloading. The content item database 122 may be searchable by the user device 206 using any suitable technique including those described herein. In some examples, the organization of data from the content item database 122 may be represented by one or more search indices. In some examples, the content item database 122 includes a plurality of searchable fields for each content item stored in the content item database 122. Such fields may be specific to the type of content item, with at least some fields being generic across types. For example, for a music file, such data fields may include header, title, artist, album, year, comment, zero byte, track number, start-time, end-time, and genre. In some examples, the values in the metadata fields may be represented by numerical codes. For example, the genre values may be represented by one number of around 200 possible numbers.

The historical record database 202 may include information about historical actions and/or historical search parameters. After a search has been generated for a current voice command, the search and associated voice command can be saved in the historical record database 202 in association with the user account.

During use, the user 110 provides a voice command to the user device 206. The user device 206 may process the voice command or may convey the voice command to the service provider 108 for processing using a natural language processing algorithm. In some examples, the user device 206 may include the natural language processing algorithm. The natural language processing algorithm may be implemented through the web service application 212 or may, in some examples be part of the contextual resolver engine 104. The contextual resolve engine 104 receives the output of the natural language processing algorithm as well as contextual data to process the voice command. The contextual data may include information related to an environment, a time, a location, data files in use or previously used by the user device 206, or any other related or relevant information that may be useful in providing insight or implicit information to aid in the processing of a voice command that is ambiguous with respect to a particular action or data object. Operations described with respect to the user device 206 may be carried out on the device or on a computing system of the service provider 108, for example in a cloud computing arrangement.

Figure 3:
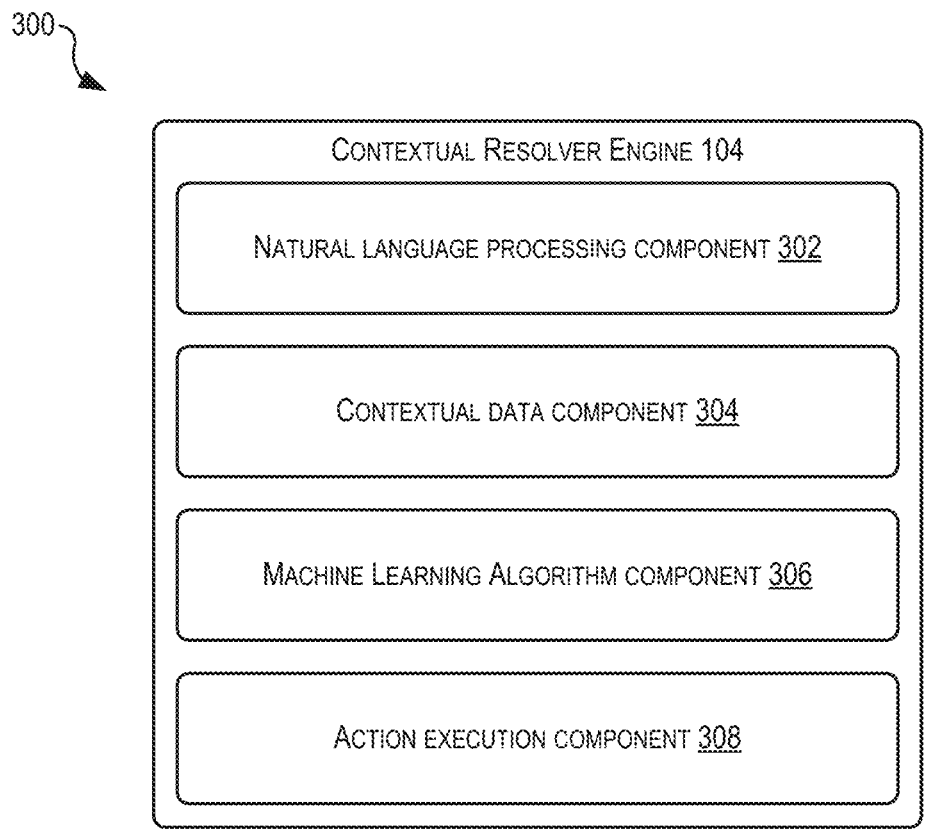
FIG. 3 illustrates an example device including the contextual resolver engine and a plurality of components, according to at least one example.

FIG. 3 illustrates an example device 300 including the contextual resolver engine 104 and a plurality of components 302-308, according to at least one example. The contextual resolver engine 104 may be configured to manage one or more sub-modules, components, engines, and/or services directed to examples disclosed herein. For example, the contextual resolver engine 104 includes a natural language processing component 302, a contextual data component 304, a machine learning algorithm component 306, and an action execution component 308. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other modules, components, engines, and/or services may perform the same tasks as the contextual resolver engine 104 or other tasks. Each module, component, or engine may be implemented in software, firmware, hardware, and in any other suitable manner.

Generally, the natural language processing component 302 is configured to provide a voice interface to enable communication between a user such as the user 110 and a device such as the voice-controlled device 106. For example, this can include enabling conversations between the user 110 and the voice-controlled device 106, receiving instructions from the user 110, providing search results to the user 110, and any other suitable communication approach. The natural language processing component 302 may process the voice command from the user 110 to identify a user request within the voice command. The natural language processing component 302 implements known natural language processing algorithms to receive spoken instructions from the user 110 and output user requests for action by the voice-controlled device 106.

Generally, the contextual data component 304 is configured to receive, store, and determine contextual data variables describing environmental parameters and conditions in association with a voice command from the user 110. The contextual data may identify a currently or previously used data object, such as a music file that is currently playing or may also describe a location of the voice-controlled device 106, a time of the voice command from the user, or other such data describing the environment and contextual information occurring at the time of the voice command from the user 110.

Generally, the machine learning algorithm component 306 receives inputs from the natural language processing component 302 describing the user request and natural language inputs from voice data from the user as well as inputs of contextual data from the contextual data component 304 describing the conditions and context surrounding the voice request. The machine learning algorithm component 306 may be trained using data of user voice requests and selection of data objects. The machine learning algorithm component 306 outputs a ranking of various data objects and/or actions to be performed based on the voice command from the user 110. In some examples, the machine learning algorithm component 306 may output a confidence score associated with one or more data objects or actions based on the inputs, with a data object or action selected based on the inputs to the machine learning algorithm component 306.

Generally, the action execution component 308 is configured to execute an action with a data object identified or determined based on the outputs of the machine learning algorithm component 306. For example, executing the user request can include accessing a data object, such as a music file, and causing the data object to be played or displayed according to the user request.

Figure 4:
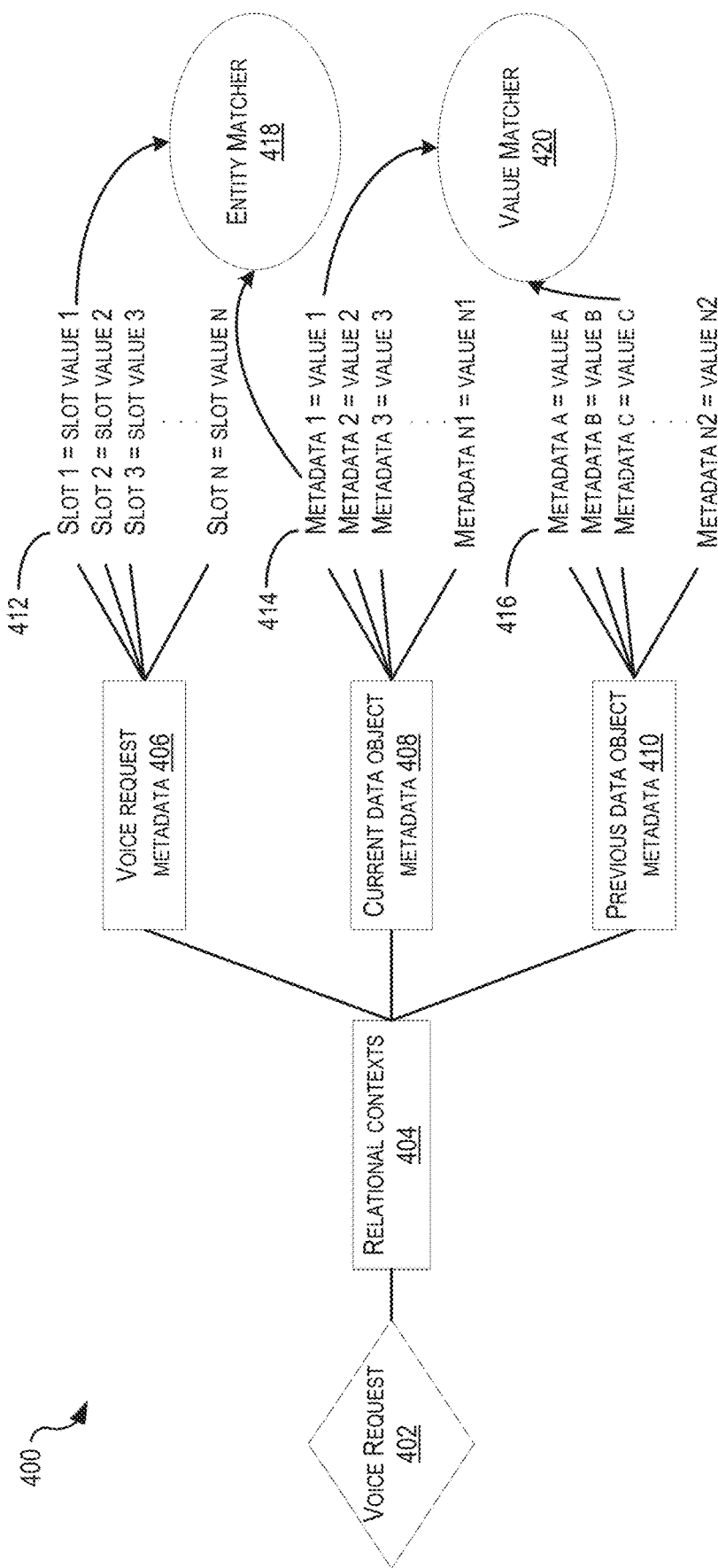
FIG. 4 illustrates an example chart illustrating a flow performed by the contextual resolver engine, according to at least one example.

FIG. 4 illustrates an example chart illustrating a flow 400 performed by the contextual resolver engine 104, according to at least one example. The contextual resolver engine 104 takes into account different types of contexts, the main ones being relational, location, and time based contexts. Relational context leverages mainly information from the currently active data objects, such as a currently active play-queue, to disambiguate the user request. For example, if the user asks "play the album" while music is playing, the contextual resolver engine 104 will match the media type "Album" from the voice request to the song metadata and identify relevant attributes such as "Album name" and "Album ID" that can identify the result to be returned. The context resolver 104 can also leverage the relationship between successive data objects to find the right content to serve. For example, a user might make multiple, successive requests that are all related to the same artist. In such a case, the contextual resolver engine 104 will identify that all the played songs have common metadata (artist), and suggest to continue playback based on the identified artist at the end of the last song.

Though the description of FIG. 4 is primarily focused on describing an example of the use of the contextual resolve engine 104 with respect to contextual resolving of ambiguous user requests with respect to music files.

The contextual resolver engine 104 may leverage location signals such the name of the voice-controlled device, the placement of the voice-controlled device in a user location such as a house, and motion sensor data to influence where a data object should be activated or performed as well as what content should be served. For example, if music is already playing on a specific voice-controlled device and the user asks to play music on another voice-controlled device placed in another room, the contextual resolver engine 104 would understand that the music referred to is the music already playing in another room at the other voice-controlled device. Motion sensors, whenever available and linked to the voice-controlled device, can also feed the contextual resolver engine 104 to automatically determine where music needs to be played. Finally the contextual resolver engine 104 may also influence the selection of a data object. For example, the contextual resolver engine 104 can match the voice-controlled device's name (e.g., Kitchen) to a specific music tag stored in the metadata (e.g., music for cooking) and use it to refine the music to be served in case of general requests such as "play music" or "play a playlist". The contextual resolver engine 104 also acts on some settings that are relevant to the location context. For example, the contextual resolver engine 104 may filter out any tracks with explicit language played on voice-controlled devices placed in a child's room.

The contextual resolver engine 104 may also combine local season, month, date, day, and/or time, at various levels of granularity, with user usage and behavior to choose responses to broad and/or ambiguous voice requests. For example, if the same user requests a voice-controlled device to simply "play music" multiple times in a day, depending on the season, day, and/or time, the contextual resolver engine 104 will return upbeat music during an early morning commute if the user has shown preference for consumption of similar music at that time and day of the week, and will return relaxing jazz when the same user makes the same "play music" request in the evening and has made requests in the past in the same context for relaxing music. The contextual resolver engine 104 can combine time-based context with location-based and relational context to select a data object and response without requiring a user to use explicit details to cause the voice-controlled device to perform as the user wishes. For example, when the voice request includes: "play Hush Little Baby", if the voice-controlled device is in a baby's room (location-based context), and it is 6:00 PM (time-based context), the contextual resolver engine 104 may find similar soothing lullabies (relational context) and continue playing them after playing the initial request.

Turning now to the flow 400 displayed in FIG. 4, which illustrates an example of a relational context carried out by the contextual resolver engine 104. At 402, a voice request is made by the user 110. When the user 110 makes the voice request 402, the relational context mode of the contextual resolver engine 104 may identify one or more lists of metadata related to the voice request, a current data object (e.g., a current music track), and previous data objects. The voice request metadata 406 includes slot types and associated values 412 identified by the natural language processing component 302. Additional voice request metadata 406 identified can include an identifier of the voice-controlled device on which the request was placed, a time of the request, and other such information.

The current data object metadata 408 includes metadata associated with a current data object in use by the voice-controlled device, for example such as metadata associated with a music file currently playing on the voice-controlled device. The metadata may include, in an example of a music file, metadata provided by music labels such as artist, album, track, etc., which may also include additional metadata such as genre, mood, or activity, among other categories. The current data object metadata is sorted into a metadata list 414 for use in matching to values subsequently.

The previous data object metadata 410 includes metadata similar to the current data object metadata, but with respect to previously used data objects, such as recently played music files. The listing of metadata 416 can also subsequently be matched to values, as described below.

The metadata lists 414 and 416 are then used by the contextual resolver engine 104 to identify context to be added to the initial voice request 402. The contextual resolver engine 104 may first match a slot value from the voice request metadata 406 to the metadata identified in metadata lists 414 and 416. For example, while a song is playing, the user can request the voice-controlled device play the album associated to that song by saying "play the album". In such a case the voice request does not include sufficient explicit information for the voice-controlled device to carry out the voice request without either follow up information or relying on implicit information from the contextual resolver engine 104. In this example, the voice request metadata may include an entry for Entity_type="album". The contextual resolver engine 104, via the entity matcher 418, then matches the slot value "album" against all metadata in metadata lists 414 and 416. The entity matcher 418 then identifies a match against "album name".

After matching the slot value against the metadata values, the contextual resolver engine 104, via the value matcher 420, will perform a matching against all identified metadata values in the metadata lists 414 and 416. The matching enables the contextual resolver engine 104 to identify any common metadata or pattern across the metadata lists 414 and 416, and find a common denominator that may be used to disambiguate the user request. For example, the value matching enables the contextual resolver engine 104 to identify that the songs previously requested are all related to the same artist by matching the artist name value within the metadata lists 414 and 416.

In a next operation, contextual information from the contextual resolver engine 104 is passed to a machine-learning algorithm that provides a confidence score for each matched result. Based on this confidence score, the contextual resolver engine 104 selects the most relevant context and adds it as an additional filtering criterion to select and return the best suited response, i.e., data object, in context to the voice request 402.

As stated above, the contextual resolver engine 104 enables the voice-controlled device to perform many other functions besides identifying and playing music files. For example, a voice request to the voice-controlled device to "buy this" can leverage contextual data such as the domain of the voice interaction session (is the user watching a movie trailer, or is she shopping for groceries) to take the appropriate action or respond to the user 110 coherently. Other contexts that the contextual resolver can leverage may be session-context, for example if a previous voice request was about the weather in Seattle, with a follow up request for good restaurants "here," the contextual resolver engine 104 may identify that the user 110 is referring to finding good restaurants in Seattle.

Figure 5:
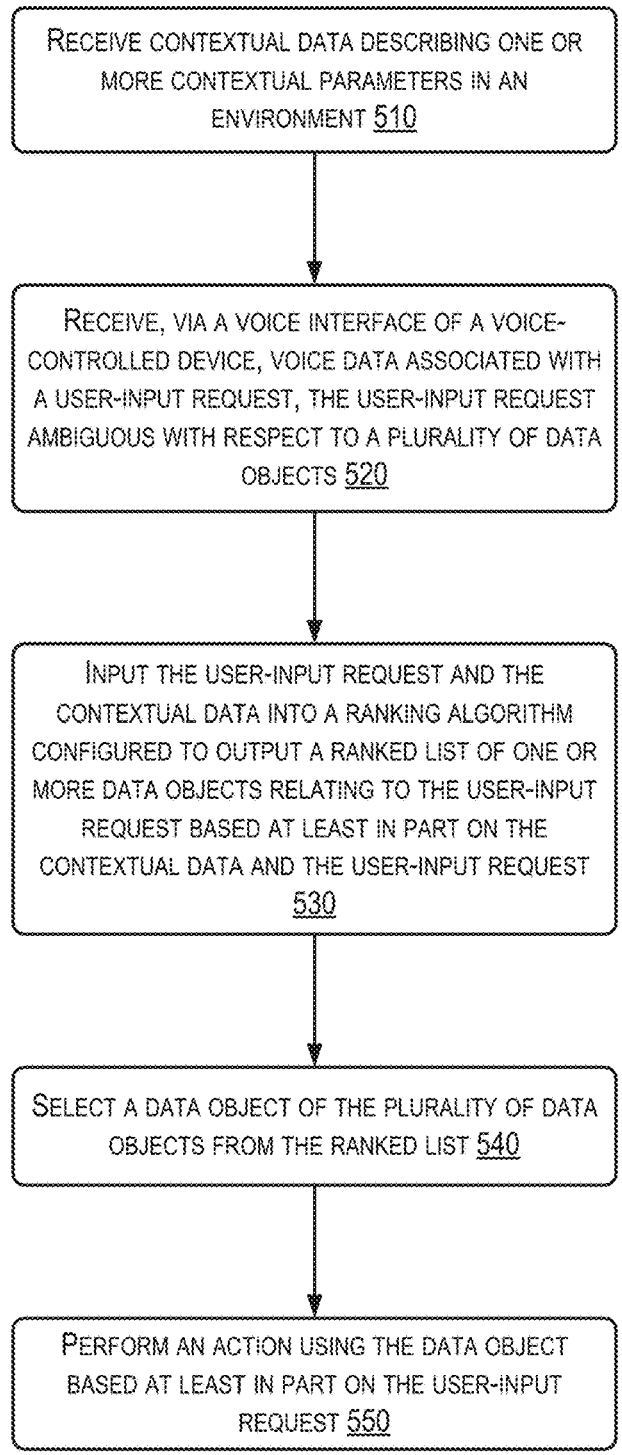
FIG. 5 is a flow diagram of a process depicting example acts for implementing techniques relating to contextual resolving of voice commands, according to at least one example.
Figure 6:
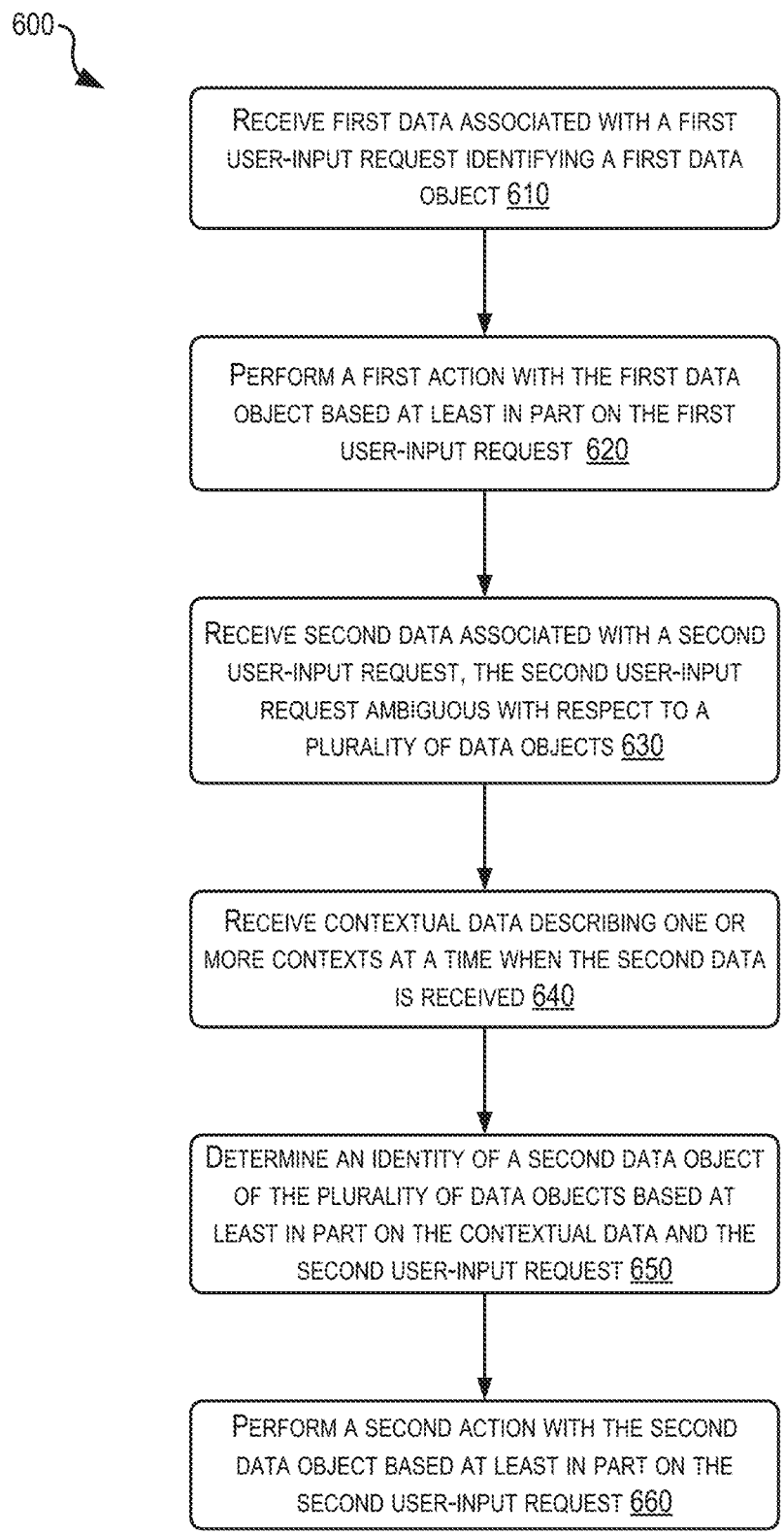
FIG. 6 is a flow diagram of a process depicting example acts for implementing techniques relating to contextual resolving of voice commands, according to at least one example.

FIGS. 5 and 6 illustrate example flow diagrams showing respective processes 500 and 600 as described herein. These processes 500 and 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes 500 and 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 5 is a flow diagram of a process 500 depicting example acts for implementing techniques relating to contextual resolving of voice commands, according to at least one example. The contextual resolver engine 104 embodied in the service provider 108 (FIG. 1) and/or in the user device 206 (FIG. 2) may perform the process 500. In some examples, the contextual resolver engine 104 may be distributed among the service provider 108 and the user device 206 and may perform the process 500 of FIG. 5.

The process 500 may begin at 510 by receiving contextual data describing one or more contextual parameters in an environment. The contextual data may include metadata associated with one or more active data objects, such as currently playing music files. The contextual data may also include metadata associated with previously active data objects as well as time, location, and other environmental or relational data. The contextual data may be parsed by the contextual resolver engine 104 to identify different categories of contextual data, such as identifying album, artist, and genre categories for a music file.

At 520, the process 500 includes receiving, via a voice interface of a voice-controlled device, voice data associated with a user-input request. The user-input request may be ambiguous with respect to a plurality of data objects. The voice request may be received through a voice interface such as a microphone, for example of a voice-controlled device that is awoken in response to a user-input, such as calling the name of the device. The voice data may be processed by a natural language processing engine to parse out a request from the voice data as well as identify slots for information that may be filled based on the contextual data.

At 530, the process 500 includes inputting the user-input request and the contextual data into a machine learning algorithm configured to output a ranked list of one or more data objects relating to the user-input request based at least in part on the contextual data and the user-input request. The contextual data may be selected as inputs to the machine learning algorithm based on identifying related slots after processing the voice data to identify the voice request. For example, by identifying that a request "play this album" includes a slot for metadata associated with an artist and album of a particular music file. The contextual data may be selected based on matching the slots identified from the voice request information and input into the machine learning algorithm. The machine learning algorithm may identify a confidence score with respect to one or more data objects based on the voice request and the contextual data input into the machine learning algorithm.

At 540, the process 500 includes selecting a data object of the plurality of data objects from the ranked list. The data object may be selected based on a confidence score output by the machine learning algorithm, or may be selected after being output as a selection from the machine learning algorithm.

At 550, the process 500 includes performing an action using the data object based at least in part on the user-input request. The action may include playing a music file via the voice-controlled device, or otherwise performing the action requested by the user in the voice request using the identified data object in the specified manner.

FIG. 6 is a flow diagram of a process 600 depicting example acts for implementing techniques relating to contextual resolving of voice commands, according to at least one example. The contextual resolver engine 104 embodied in the service provider 108 (FIG. 1) 30 and/or in the user device 206 (FIG. 2) may perform the process 600. In some examples, the contextual resolver engine 104 may be distributed among the service provider 108 and the user device 206 and may perform the process 600 of FIG. 6.

The process 600 may begin at 610 by receiving first data associated with a first user-input request identifying a first data object. The first data may include explicit information sufficient to select a particular data object and perform an action, such as selecting a music file to play and subsequently playing the music file via the voice-controlled device. In some examples, the first data may be received from an electronic device, such as a mobile device or personal computing device. The first data may, for example, include a user shopping for an item on an e-commerce website, interacting with an advertisement, or otherwise indicating an identity of the first data object.

At 620, the process 600 includes performing a first action with the first data object based at least in part on the first user-input request. The first action is based on the first voice data and includes a first request, such as a request to play a particular, explicitly identified music file. The first request may include requesting additional information related to the object, such as with respect to an e-commerce item. The first action may include accessing additional details, adding the item to a shopping cart, interacting with an advertisement for an item, or selecting a recipe including a list of ingredients required for the recipe or other list of items.

At 630, the process 600 includes receiving second data associated with a second user-input request, the second user-input request ambiguous with respect to a plurality of data objects. The second data, and the first data may each be voice data received by a voice-controlled device and may be processed by a natural language processing algorithm to identify the voice request as well as relevant information or relevant information slots. For example, the second user-input request may indicate that the user wishes to play "this album" without identification of the name of the album or to "turn off this light" without identification of the light, or to "add these items to my shopping cart" without specific identification of the items (which may, for example be items included in a digital recipe or on an e-commerce shopping page). The contextual resolver may identify that contextual data associated with the first request and matching the slot "album" may provide contextual information to fulfill the second request without requiring additional input from the user, even though the second voice data does not explicitly identify the album to be played.

At 640, the process 600 includes receiving contextual data describing one or more contexts at a time when the second data is received. The contextual data may include metadata associated with the first data object, may include environmental data, time data, or other such data as described herein that matches one or more slots associated with the second request.

At 650, the process 600 includes determining an identity of a second data object of the plurality of data objects based at least in part on the contextual data and the second user-input request. In some examples, the contextual data and the second request may be input into a machine learning algorithm to provide a confidence score with respect to a second data object. In some examples, the contextual data may be useful in identifying implicit information, such as information associated with the first data object that would provide sufficient information to complete the second request.

At 660, the process 600 includes performing a second action with the second data object based at least in part on the second user-input request. The action may include playing a music file via the voice-controlled device, or otherwise performing the action requested by the user in the voice request using the identified data object in the specified manner.

Figure 7:
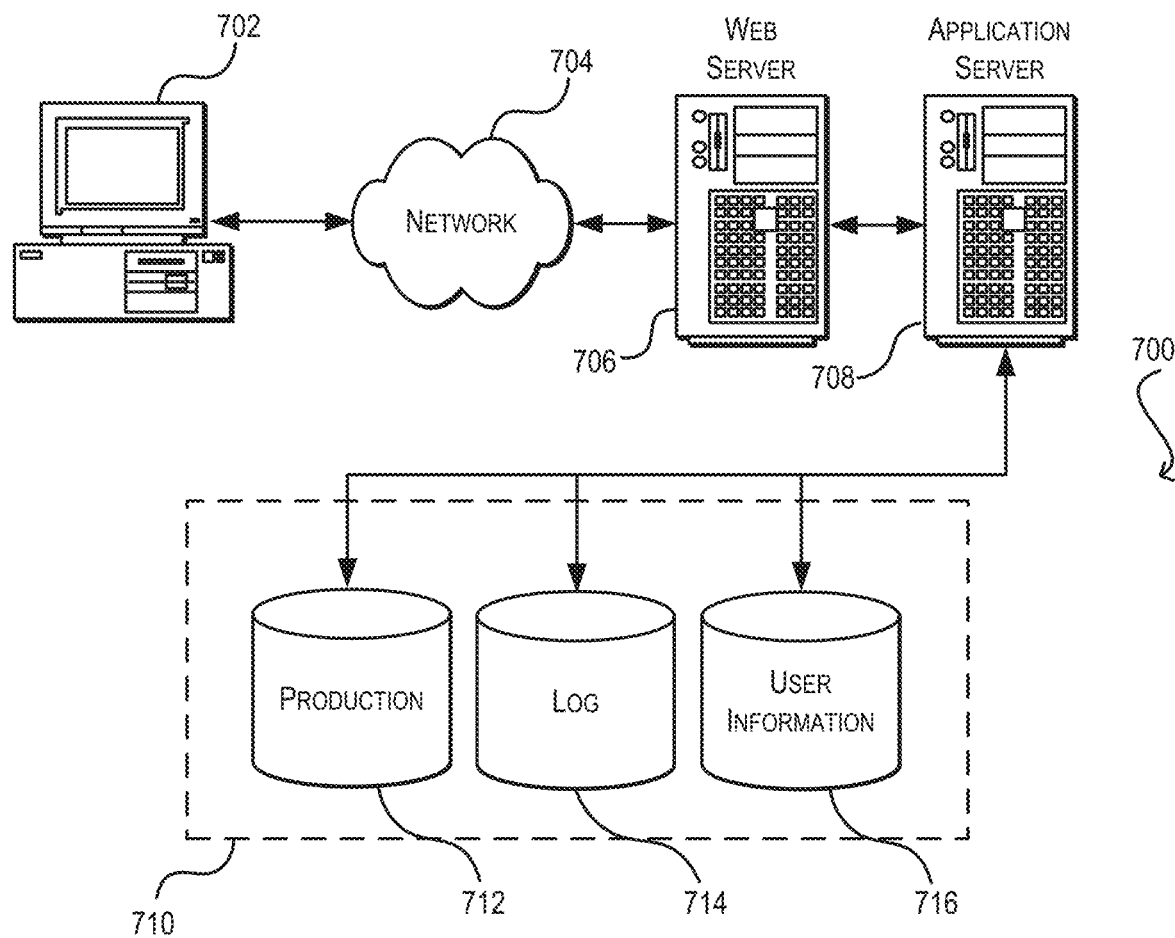
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media, such as computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a memory configured to store computer-executable instructions; and
   a processor configured to access the memory and execute the computer-executable instructions to at least:
   receive, via a voice interface of a voice-controlled device, first voice data associated with a first request to play first media content;
   cause the first media content to play, via an output component, in response to the first request;

receive, via the voice interface of the voice-controlled device and while the first media content is playing, second voice data associated with a second request to play media content;

receive contextual data describing one or more contexts;

execute a ranking algorithm with the second request and the contextual data as inputs, the ranking algorithm configured to output a ranked list of one or more media content files related to the second request by:

identifying metadata slot values from the second request, the metadata slot values corresponding to the one or more contexts;

matching the metadata slot values with first metadata associated with the first media content to produce matched contexts;

matching the first metadata associated with the first media content with additional metadata associated with additional media content files to produce common metadata values;

inputting the matched contexts and the common metadata values into the ranking algorithm;

generating confidence scores corresponding to each of the matched contexts and the common metadata values, the confidence scores characterizing a ranking of the matched contexts and the common metadata values; and generating, using the confidence scores and based at least in part on the ranking, the ranked list of one or more media content files;

select a second media content file from the ranked list; and play the second media content file, via the output component, in response to the second request.

2. The system of claim 1, wherein the contextual data comprises metadata identifying information associated with the first media content.

3. The system of claim 1, wherein the contextual data comprises environmental data including a time and location associated with the second request.

4. The system of claim 1, wherein:

causing the first media content to play in response to the first request comprises processing, using a natural language processing algorithm, the first voice data to identify the first request; and executing the ranking algorithm comprises processing, using the natural language processing algorithm, the second voice data to identify the second request.

5. A computer-implemented method, comprising:

receiving, at a computing device, first data associated with a first user-input request identifying a first data object;

performing, by the computing device, a first action with the first data object based at least in part on the first user-input request;

receiving, at the computing device from a voice-controlled device, second voice data associated with a second user-input request;

obtaining, by the computing device responsive to receiving the second voice data, contextual data describing one or more contexts at a time when the second voice data is received, the contextual data associated with the first user-input request;

determining, by the computing device, an identity of a second data object of a plurality of data objects by at least:

identifying, using the contextual data, metadata slot values from the second user input wherein each metadata slot value corresponds to a parameter identified from the second user input;

matching the metadata slot values with first metadata associated with the first data object to produce matched contexts;

matching the first metadata associated with the first data object with additional metadata associated with the plurality of data objects to produce common metadata values;

executing a ranking algorithm taking the matched contexts and the common metadata values as input;

receiving confidence scores output by the ranking algorithm, the confidence scores corresponding to each of the matched contexts and the common metadata values and characterizing a ranking of the matched contexts and the common metadata values; and based at least in part on the ranking, selecting, using the confidence scores, the second data object from the plurality of data objects; and performing, by the computing device, a second action with the second data object based at least in part on the second user-input request.

6. The computer-implemented method of claim 5, wherein the contextual data comprises at least one of a playing song identity, a playlist identity, a mood, a location of a voice-input device, an album identity, a time, an artist identity, a genre identity, an era identity, a tempo, user profile metadata, user preferences, or a user history of interactions with the voice-input device.

7. The computer-implemented method of claim 5, wherein the first data and the second voice data are each associated with a user of a user account; and wherein determining the identity of the second data object further comprises:

accessing a user history of interactions of the user with a voice-input device;

determining additional matched contexts using the user history; and executing the ranking algorithm using the additional matched contexts as a further input.

8. The computer-implemented method of claim 5, wherein:

the first data object is a first music file;

the contextual data comprises an identifier of the first music file; and the second data object comprises a collection of music files in an album associated with the identifier, the collection of music files including the first music file.

9. The computer-implemented method of claim 8, wherein the first data is at least one of voice data or user interaction data with an electronic device.

10. The computer-implemented method of claim 5, wherein the contextual data comprises data describing a device type or an identity of a device controlled by a user and associated with the second user-input request.

11. The computer-implemented method of claim 10, wherein the second user-input request comprises a request to access the second data object, and wherein the contextual data describes environmental data in a location of an electronic device that receives the first data.

12. The computer-implemented method of claim 5, wherein receiving the contextual data comprises identifying a set of metadata related to the first user-input request or the first data object and wherein determining the identity of the second data object further comprises appending the set of metadata to the second user-input request.

13. The computer-implemented method of claim 5, wherein determining the identity of the second data object comprises:
   determining a subset of the matched contexts and the common metadata values having corresponding confidence scores exceeding a threshold confidence score; and
   filtering the plurality of data objects using the subset of the matched contexts and the common metadata values.

14. One or more non-transitory computer-readable media comprising computer-executable instructions that, when executed by one or more computer systems, cause the one or more computer systems to perform operations comprising:
   receiving contextual data describing one or more contextual parameters in an environment;
   receiving, via a voice interface of a voice-controlled device, voice data associated with a user-input request, the user-input request ambiguous with respect to a plurality of data objects;
   executing a ranking algorithm with the user-input request and the contextual data, the ranking algorithm configured to output a ranked list of one or more data objects relating to the user-input request by:
      identifying metadata slot values from the user input request, the metadata slot values corresponding to the one or more contextual parameters;
      matching the metadata slot values with first metadata associated with a first data object of the plurality of data objects to produce matched contexts;
      matching the first metadata associated with the first data object with additional metadata associated with the plurality of data objects to produce common metadata values; and
      inputting the matched contexts and the common metadata values into the ranking algorithm;
      generating confidence scores corresponding to each of the matched contexts and the common metadata values, the confidence scores characterizing a ranking of the matched contexts and the common metadata values; and
      generating, using the confidence scores and based at least in part on the ranking, the ranked list of one or more data objects;
   selecting a data object of the plurality of data objects from the ranked list; and
   performing an action using the data object based at least in part on the user-input request.

15. The one or more non-transitory computer-readable media of claim 14, wherein the contextual data comprises:
   time data describing a time when the user-input request is received;
   a location of the voice-controlled device;
   relational data describing a relationship of the data object to a previously accessed data object; or
   a user history describing previous interactions of a user with the voice-controlled device.

16. The one or more non-transitory computer-readable media of claim 14, wherein executing the ranking algorithm comprises processing the user-input request with a natural language processing algorithm.

17. The one or more non-transitory computer-readable media of claim 14, wherein:
   the voice-controlled device is a first voice-controlled device;
   the contextual data comprises data from a second voice-controlled device;
   the user-input request comprises a request to transfer an action from the second voice-controlled device to the first voice-controlled device.

18. The one or more non-transitory computer-readable media of claim 14, wherein executing the ranking algorithm comprises processing the voice data with a natural language processing algorithm to identify the user-input request from the voice data.

19. The one or more non-transitory computer-readable media of claim 14, wherein generating the ranked list comprises:
   selecting, from the matched contexts and the common metadata values, a context having a highest corresponding confidence score according to the ranking; and
   filtering the plurality of data objects using the context to produce the ranked list.

20. The one or more non-transitory computer-readable media of claim 14, wherein selecting the data object of the plurality of data objects from the ranked list comprises selecting a highest ranked data object from the ranked list.

* * * * *